United States Patent
Watanabe et al.

(10) Patent No.: US 11,976,387 B2
(45) Date of Patent: May 7, 2024

(54) METHOD OF RECYCLING CARBON FIBER

(71) Applicant: TOYOTA JIDOSHA KABUSHIKI KAISHA, Toyota (JP)

(72) Inventors: Toshio Watanabe, Toyota (JP); Terufumi Takayama, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 584 days.

(21) Appl. No.: 17/322,141

(22) Filed: May 17, 2021

(65) Prior Publication Data

US 2022/0010463 A1 Jan. 13, 2022

(30) Foreign Application Priority Data

Jul. 9, 2020 (JP) .................... 2020-118141

(51) Int. Cl.
*D01F 9/24* (2006.01)
*C08J 5/04* (2006.01)
*D01D 10/04* (2006.01)
*D01F 13/04* (2006.01)

(52) U.S. Cl.
CPC ............... *D01F 9/24* (2013.01); *C08J 5/042* (2013.01); *D01D 10/0409* (2013.01); *D01F 13/04* (2013.01); *C08J 2363/00* (2013.01); *D10B 2101/12* (2013.01)

(58) Field of Classification Search
CPC ... D01F 9/24; D01F 13/04; C08J 5/042; C08J 2363/00; C08J 11/00; D01D 10/0409; D10B 2101/12; Y02P 70/62; Y02W 30/62; C08K 7/06
See application file for complete search history.

(56) References Cited

U.S. PATENT DOCUMENTS

| 2010/0189629 A1 | 7/2010 | Price et al. |
| 2017/0157801 A1* | 6/2017 | Yang .................. B29B 17/02 |
| 2020/0079918 A1* | 3/2020 | Toyoshima ............ B09B 5/00 |

FOREIGN PATENT DOCUMENTS

| CN | 101918187 A | 12/2010 | |
| CN | 107022108 A | 8/2017 | |
| JP | H07033904 A | 2/1995 | |
| JP | 2013237716 A | 11/2013 | |
| JP | 2015000897 A | 1/2015 | |
| JP | 2017104847 A | 6/2017 | |
| JP | 2019-172799 | * 10/2019 | ............. C08J 11/12 |
| JP | 2019172799 A | 10/2019 | |
| WO | 2018212016 A1 | 11/2018 | |

* cited by examiner

Primary Examiner — Daniel C. McCracken
(74) Attorney, Agent, or Firm — Dickinson Wright, PLLC

(57) ABSTRACT

An embodiment is a method of recycling carbon fibers that includes: preparing a carbon fiber reinforced plastic formed product that includes a carbon fiber reinforced plastic containing a carbon fiber and a resin; thermally decomposing or dissolving the resin in the carbon fiber reinforced plastic formed product by a first heating process or a first dissolving process; and winding while drawing the carbon fiber from the carbon fiber reinforced plastic formed product after the first heating process or the first dissolving process. The winding further includes thermally decomposing or dissolving a residue of the resin attached to the carbon fiber by a second heating process or a second dissolving process and adding a sizing agent to the carbon fiber after the second heating process or the second dissolving process.

10 Claims, 3 Drawing Sheets

METHOD OF RECYCLING CARBON FIBER

CROSS REFERENCE TO RELATED APPLICATIONS

The present application claims priority from Japanese patent application JP 2020-118141 filed on Jul. 9, 2020, the entire content of which is hereby incorporated by reference into this application.

BACKGROUND

Technical Field

The present disclosure relates to a method of recycling carbon fibers.

Background Art

A carbon fiber reinforced plastic (CFRP) is a material that is lightweight, has high rigidity, and can withstand high pressure hydrogen. Therefore, it is used for carbon fiber reinforced plastic formed products, such as hydrogen tanks of fuel cell (FC) vehicles. In addition, the carbon fiber reinforced plastic formed products are used in a wide range of fields, such as products for sports and leisure purposes and components for aerospace use, other than the tanks. However, carbon fibers included in the carbon fiber reinforced plastic are expensive and involve high environmental load because they generate a large amount of $CO_2$ during production and are hard to be disposed. Therefore, a method of collecting and recycling the carbon fibers from used carbon fiber reinforced plastic formed product has been examined.

For example, WO2018/212016 discloses a method for producing regenerated carbon fiber bundles, which can obtain multiple carbon fiber base materials in the form of regenerated carbon fiber bundles from a carbon fiber-reinforced plastic containing the multiple carbon fiber base materials and a matrix resin, and the method includes heating the carbon fiber-reinforced plastic to thermally decompose the matrix resin, thereby obtaining a heat-treated product and disintegrating the heat-treated product to separate the multiple carbon fiber base materials.

JP 2015-000897 A discloses a recycling method for a plastic material, and the recycling method is characterized by having a step of heating the plastic material using superheated steam of 400° C. or lower at normal pressure.

JP 2013-237716 A discloses a regeneration treatment method for carbon fibers which is characterized by including: a bulk density packing step of packing a carbon fiber reinforced plastic containing carbon fibers and a matrix component into a housing-shaped heating cage in which each surface is formed of a breathable material so as to have a predetermined bulk density; a heating cage conveying step of conveying the heating cage packed with the carbon fiber reinforced plastic into a regeneration treatment unit where an elongated tunnel-shaped regeneration treatment space is constructed of a refractory material inside and an introduction port and a discharge port communicating with the regeneration treatment space are each opened; a heating and removing step of heating the conveyed carbon fiber reinforced plastic in the heating cage and removing the matrix component by a heating and removing unit provided in a heating region of the regeneration treatment space; and a cooling step of cooling the regenerated carbon fiber from which the matrix component has been heat-removed, while conveying it, by a cooling unit provided in a cooling region on the downstream side of the conveyance of the heating region in the regeneration treatment space.

JP 2019-172799 A discloses a method of collecting carbon fibers from a carbon fiber reinforced plastic formed product, which includes: a thermally decomposing step of thermally decomposing a matrix resin by placing the carbon fiber reinforced plastic formed product including a cylindrical body made of a carbon fiber reinforced plastic in a thermal decomposing furnace while keeping its shape of the cylindrical body, and a collecting step of collecting the carbon fibers by drawing the carbon fiber out from the inner surface of the cylindrical body in the axis direction of the cylindrical body.

SUMMARY

As disclosed in WO2018/212016, JP 2015-000897 A, JP 2013-237716 A, and JP 2019-172799 A, the methods of collecting the carbon fiber from the carbon fiber reinforced plastic formed products have been examined. However, in WO2018/212016, a step of crushing the matrix resin is proposed, and thus continuous carbon fibers cannot be obtained. Therefore, reusable carbon fibers cannot be obtained for formed products that require the continuous carbon fibers. Also, in JP 2015-000897 A, a step of pulverizing a heated plastic material is proposed, and thus the continuous carbon fibers cannot be obtained. Also, in JP 2013-237716 A, a step of cutting the carbon fiber reinforced plastic to a predetermined size is proposed, and thus the continuous carbon fiber cannot be obtained. When steps of crushing, pulverizing, and cutting are included similarly to WO2018/212016, JP 2015-000897 A, and JP 2013-237716 A, only the carbon fiber having a length of several mm to several cm can be obtained, and the carbon fibers cannot be recycled as the continuous fibers. On the other hand, by the method of JP 2019-172799 A, although it is considered that the continuous carbon fibers can be obtained, the carbon fibers unsuitable for reuse is obtained because a large amount of residue of the resin (such as, soot) remains in the carbon fiber.

Therefore, the embodiment provides a method of recycling the carbon fibers that enables to effectively obtain the continuous carbon fibers suitable for reuse.

One aspect of the embodiment will be described as follows.

(1) A method of recycling carbon fibers, the method comprises:
  preparing a carbon fiber reinforced plastic formed product that includes a carbon fiber reinforced plastic containing a carbon fiber and a resin;
  thermally decomposing or dissolving the resin in the carbon fiber reinforced plastic formed product by a first heating process or a first dissolving process; and
  winding while drawing the carbon fiber from the carbon fiber reinforced plastic formed product after the first heating process or the first dissolving process,
  wherein the winding further includes thermally decomposing or dissolving a residue of the resin attached to the carbon fiber by a second heating process or a second dissolving process and adding a sizing agent to the carbon fiber after the second heating process or the second dissolving process.

(2) The method according to (1), wherein the carbon fiber is stripped upstream while the carbon fiber is wound downstream, and the residue of the resin is removed by the second heating process or the second dissolving process and subsequently the sizing agent is added after the carbon fiber is stripped and before the carbon fiber is wound.

(3) The method according to (1) or (2), wherein the resin in the carbon fiber reinforced plastic formed product is thermally decomposed by the first heating process.

(4) The method according to (3), wherein the first heating process is performed using superheated steam.

(5) The method according to (3) or (4), wherein the first heating process has a temperature of 400° C. to 500° C.

(6) The method according to any one of (1) to (5), wherein the residue of the resin attached to the carbon fiber is thermally decomposed by the second heating process.

(7) The method according to (6), wherein the second heating process is performed using superheated steam.

(8) The method according to (6) or (7), wherein the second heating process has a temperature of 500° C. to 600° C.

(9) The method according to any one of (1) to (8), wherein the carbon fiber is drawn to apply a tensile force of 4 to 5 MPa to the carbon fiber.

(10) The method according to any one of (1) to (9), wherein the carbon fiber reinforced plastic formed product is a tank.

The embodiment can provide a carbon fiber recycling method that enables to effectively obtain the continuous carbon fibers suitable for reuse.

DETAILED DESCRIPTION

The embodiment is a method of recycling carbon fibers that includes: preparing a carbon fiber reinforced plastic formed product that includes a carbon fiber reinforced plastic containing a carbon fiber and a resin; thermally decomposing or dissolving the resin in the carbon fiber reinforced plastic formed product by a first heating process or a first dissolving process; and winding while drawing the carbon fiber from the carbon fiber reinforced plastic formed product after the first heating process or the first dissolving process. The winding further includes thermally decomposing or dissolving a residue of the resin attached to the carbon fiber by a second heating process or a second dissolving process and adding a sizing agent to the carbon fiber after the second heating process or the second dissolving process.

The embodiment can provide a carbon fiber recycling method that enables to effectively obtain the continuous carbon fibers suitable for reuse.

The following describes the embodiment in detail.

The embodiment is the method of recycling the carbon fibers from the carbon fiber reinforced plastic formed products. The carbon fiber reinforced plastic formed products have the carbon fiber reinforced plastic containing the carbon fibers and the resin. The carbon fiber reinforced plastic formed product is not specifically limited, and includes, for example, a tank. The tank includes, for example, a hydrogen tank for storing hydrogen. Although, in the following example, the tank will be described as an example of the carbon fiber reinforced plastic formed product, the embodiment is not limited to this. Note that, although the embodiment relates to the method of recycling the carbon fibers, the method of recycling the carbon fibers should be understood to mean a method of producing the carbon fibers.

Figure 1:
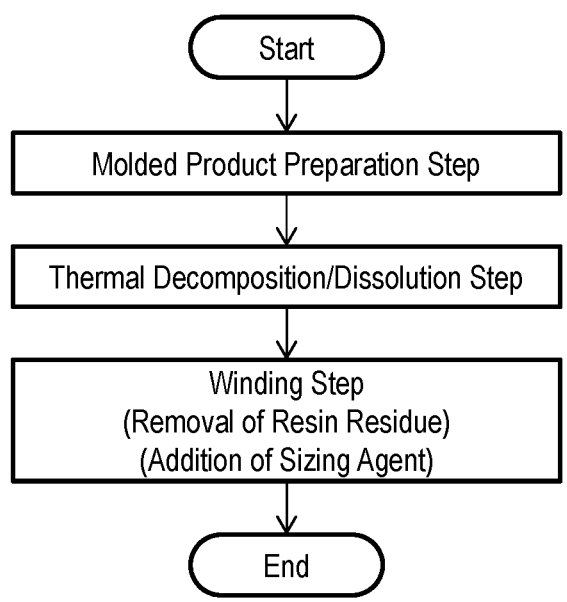
FIG. 1 is a flowchart of a method according to the embodiment.

FIG. 1 illustrates a flowchart of the method according to the embodiment. As illustrated in FIG. 1, the embodiment includes a formed product preparing step, a thermal decomposing/dissolving step, and a winding step. In the winding step, while the carbon fiber is wound, the resin residue is removed and a sizing agent is added. The following describes each step in detail.

Formed Product Preparing Step

The recycling method according to the embodiment includes a step of preparing the carbon fiber reinforced plastic formed product that has the carbon fiber reinforced plastic containing the carbon fibers and the resin.

As described above, the carbon fiber reinforced plastic formed product is not specifically limited, and includes, for example, the tank.

Figure 2:
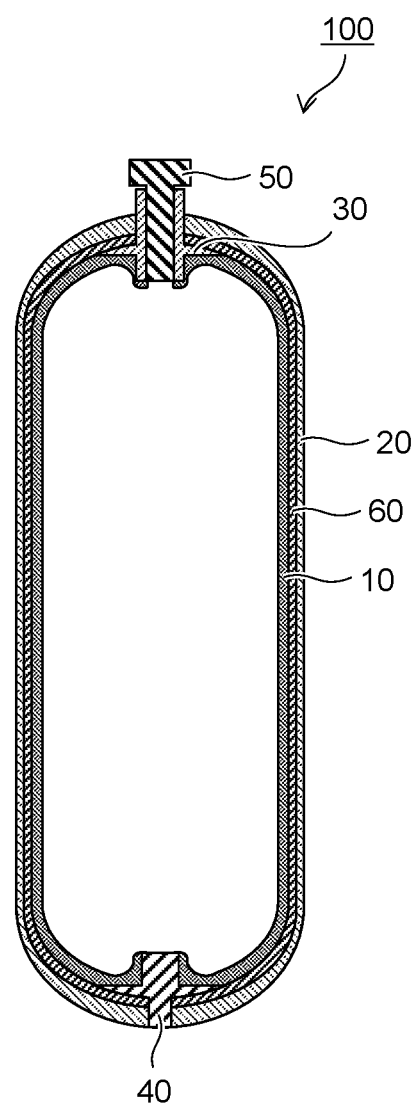
FIG. 2 is a schematic cross-sectional view illustrating an exemplary configuration of a tank 100.

FIG. 2 is a cross-sectional view illustrating an exemplary configuration of a tank 100. FIG. 2 illustrates the cross-sectional view taken along a plane parallel to the central axis of the tank 100 and passing through the central axis. The central axis of the tank 100 corresponds to the axis passing through the center of the circle of the tank main body having approximately cylindrical shape. The tank 100 can be used, for example, to fill a gas, such as compressed hydrogen. For example, the tank 100 is mounted on a fuel cell vehicle in a state of being filled with the compressed hydrogen in order to supply the hydrogen to a fuel cell device.

The tank 100 includes a liner 10 (made of nylon resin), a carbon fiber reinforced plastic layer 20 as an outer shell, a valve-side base 30, an end-side base 40, and a valve 50. Further, a protective layer 60 is arranged between the liner 10 and the carbon fiber reinforced plastic layer 20. The liner 10 has a hollow shape having a space where the hydrogen is filled inside and has a gas barrier property to seal the internal space such that the hydrogen does not leak outside.

The carbon fiber reinforced plastic layer 20 is a plastic layer formed to cover the outside of the liner 10 and the protective layer 60. The carbon fiber reinforced plastic layer 20 is formed to cover the outer surface of the protective layer 60. The protective layer 60 is formed to cover the inner surface of the carbon fiber reinforced plastic layer 20 and is formed to partially cover the bases 30 and 40. The carbon fiber reinforced plastic layer has a function of reinforcing mainly the liner 10 (reinforcing layer). The liner 10 is formed to cover the inner surface of the protective layer 60.

In FIG. 2, the valve-side base 30 has an approximately cylindrical shape and is inserted and secured between the liner 10 and the protective layer 60. The approximately column-shaped opening of the valve-side base 30 functions as the opening of the tank 100. While in the embodiment, the valve-side base 30 can be formed of, for example, stainless steel, the valve-side base 30 may be made of another metal, such as aluminum, and may be made of resin. The valve 50 has a male screw formed on the column-shaped portion and is screwed into a female screw formed on the internal surface of the valve-side base 30 such that the valve 50 closes the opening of the valve-side base 30. The end-side base 40 can be made of, for example, aluminum, is assembled in a state of being partially exposed to the outside, and serves to conduct the heat inside the tank to the outside.

The carbon fiber reinforced plastic layer contains the carbon fibers and the resin (matrix resin).

The resin is not specifically limited, and includes, for example, phenol resin, urea resin, unsaturated polyester resin, vinylester resin, polyimide resin, bismaleimide resin, polyurethane resin, diallyl phthalate resin, epoxy resin, or a mixture of them. In some embodiments, the resin is the epoxy resin. As the epoxy resin, an epoxy resin conventionally known in the technical field can be used. The epoxy resin is not limited, and includes, for example, bisphenol A type epoxy resin, bisphenol AD type epoxy resin, bisphenol F type epoxy resin, phenol novolac type epoxy resin, cresol novolac type epoxy resin, and glycidyl ester type epoxy resin. The epoxy resin may be a straight chain type or a branched type. For the resin, one kind may be used alone, or two or more kinds may be used in combination.

The carbon fiber can be prepared by a method conventionally known in the technical field. As the carbon fiber, it is only necessary that the material contains carbon as the main component, and the carbon fiber includes, for example, a carbon fiber made of acrylic as the raw material, or a carbon fiber made of pitch as the raw material. Among them, the carbon fiber is a PAN based carbon fiber which is produced from a polyacrylonitrile fiber as the raw material in some embodiments.

The carbon fiber reinforced plastic layer can be formed by, for example, a filament winding method. A filament winding formed product can be produced by aligning a plurality of carbon fiber bundles as necessary, impregnating the carbon fiber bundles with the matrix resin, and winding the carbon fiber bundles at an appropriate angle around a rotating substrate body or a mold to an appropriate thickness while applying tension.

Thermal Decomposing/Dissolving Step

The recycling method according to the embodiment includes a step of thermally decomposing or dissolving the resin in the carbon fiber reinforced plastic formed product by a first heating process or a first dissolving process.

In the embodiment, the carbon fiber reinforced plastic formed product is not crushed or pulverized. As the carbon fiber reinforced plastic formed product, only the cylindrically shaped portion of the tank may be used. Metal components and the like in the carbon fiber reinforced plastic formed product may be removed before the decomposing/dissolving step or may be removed after the decomposing/dissolving step.

The first heating process can be performed on the carbon fiber reinforced plastic formed product inside a heat treatment chamber. The carbon fiber reinforced plastic formed product is heated in the heat treatment chamber to thermally decompose the matrix resin in the carbon fiber reinforced plastic formed product. The heat treatment chamber may be a heating furnace or may be a heating device having a space that enables a heating medium to be introduced inside and/or to be discharged.

The temperature of the first heating process is not specifically limited but is 400° C. to 500° C. in some embodiments. When the temperature of the first heating process is 400° C. or higher, the decomposition of the resin proceeds promptly. When the temperature of the first heating process is 500° C. or lower, damage to the carbon fiber can be suppressed.

In some embodiments, the first heating process is performed using superheated steam. Use of the superheated steam can suppress the decomposition of the carbon fiber. In some embodiments, the temperature of the superheated steam is 400° C. to 500° C. For example, the first heating process can be performed by introducing normal pressure superheated steam into a normal pressure reaction vessel. Further, the first heating process is not specifically limited, but may be performed under an inert atmosphere, such as nitrogen. In some embodiments, a decomposition gas of the resin generated by the thermal decomposition is removed while the heated superheated steam, air, or an inert gas is supplied into the heat treatment chamber.

The period of the first heating process is not specifically limited and can be appropriately set corresponding to the heating temperature, the resin, and the like. The heating period is, for example, 1 to 10 hours.

The degree of the decomposition of the resin in the first heating process can be controlled with the temperature of the heating process (for example, the temperature of the superheated steam) and the period of the heating process. If the temperature of the heating process is too high, the carbon fiber tends to become brittle, and if the temperature of the heating process is too low, the remaining amount of the resin tends to increase. If the period of the heating process is too long, the carbon fiber tends to become brittle, and if the period of the heating process is too short, the remaining amount of the resin tends to increase.

The first dissolving process is performed using a dissolving liquid that can dissolve the resin in the carbon fiber reinforced plastic. The dissolving liquid is not specifically limited as long as being capable of dissolving the resin, and includes, for example, an acidic solution, such as phosphoric acid and sulfuric acid. The acidic solution includes a solution containing sulfuric acid (for example, a concentration of 90% by mass or more) as described in JP 2020-37638 A, a solution containing the phosphoric acid as described in JP 2020-50704 A, and the like. Further, the dissolving liquid includes, for example, a liquid containing an organic solvent and, if necessary, a decomposition catalyst, as described in JP 2020-45407 A. The kind of the organic solvent is not specifically limited, and includes, for example, alcohol-based solvent, ketone-based solvent, ether-based solvent, amide-based solvent, or ester-based solvent.

The period of the first dissolving process is not specifically limited and can be appropriately set corresponding to the dissolving liquid, the resin, and the like.

In the carbon fiber after the first heating process or the first dissolving process, a residue of the resin remains in the fibers. Due to this residue of the resin, the carbon fiber can keep its bundled form. When the carbon fibers that are collected with this remaining residue are mixed with a new resin composition when being reused, the residue remains between the resin composition and the carbon fibers. Therefore, since the carbon fibers have low adhesion and cannot regenerate strong composite material, it is not suitable for reuse. In the embodiment, this residue of the resin is removed by the winding step.

Winding Step

The recycling method according to the embodiment includes a step of winding while drawing the carbon fiber from the carbon fiber reinforced plastic formed product after the first heating process or the first dissolving process, and the winding step further includes a step of thermally decomposing or dissolving the residue of the resin attached to the carbon fiber by the second heating process or the second dissolving process and a step of adding a sizing agent to the carbon fiber after a second heating process or a second dissolving process. Specifically, the carbon fiber is wound downstream while being stripped upstream. After being stripped and before being wound, the residue of the resin is removed by the second heating process or the second dissolving process, and subsequently the sizing agent is added. Performing the removal of the residue of the resin and the addition of the sizing agent while winding can obtain the carbon fiber suitable for reuse.

Specifically, first, a part of the carbon fiber is taken out from the carbon fiber reinforced plastic formed product after the first heating process or the first dissolving process. In some embodiments, the part of the carbon fiber is an end part of the carbon fiber. This taken out part of the carbon fiber is connected to a winding machine, and the winding machine pulls and winds the carbon fiber in a state of the continuous fiber. While the carbon fiber is wound, the resin residue is removed, and the sizing agent is added.

The removal of the resin residue is not specifically limited, but can be performed, for example, by the heating process or the dissolving process (the second heating process or the second dissolving process).

The second heating process can be performed using a heat treatment chamber. Specifically, the heat treatment chamber is arranged between the winding machine and the carbon fiber reinforced plastic formed product, and respective elements are configured such that the drawn carbon fiber enters the heat treatment chamber and is heat-treated. The residue of the resin attached to the carbon fiber by the heating process is removed by the thermal decomposition. After the carbon fiber is heated in the heat treatment chamber, it is conveyed to the outside to undergo the next sizing agent process.

The temperature of the second heating process is not specifically limited but is 500° C. to 600° C. in some embodiments. Since the second heating process heats the carbon fiber while being wound (that is, while being conveyed), the period is relatively short. Therefore, setting the temperature of the heating process to a relatively high 500° C. or higher allows the resin residue to be effectively removed. When the temperature of the second heating process is 600° C. or lower, damage to the carbon fiber can be suppressed. The period of the second heating process is, for example, 1 to 30 minutes.

In some embodiments, the second heating process is performed using the superheated steam. Use of the superheated steam can suppress the decomposition of the carbon fiber. In some embodiments, the temperature of the superheated steam is 500° C. to 600° C. For example, the second heating process can be performed by introducing the normal pressure superheated steam into a normal pressure reaction vessel. Further, the second heating process is not specifically limited, but may be performed under the inert atmosphere, such as nitrogen. While the heated superheated steam, air, an oxygen gas, an inert gas or a mixture of them is supplied into the heat treatment chamber, the decomposition gas of the resin generated by the thermal decomposition can be removed. Further, in some embodiments, in the second heating process, the superheated steam and the air or the oxygen gas are introduced into the heat treatment chamber. By introducing the oxygen in addition to the superheated steam into the heat treatment chamber, the resin residue can be efficiently removed. Further, the second heating process may introduce nitrogen and/or carbon dioxide as a process adjusting gas into the heat treatment chamber. By introducing the nitrogen and/or carbon dioxide in addition to the superheated steam, the strength of the carbon fiber can be enhanced.

The degree of the decomposition of the resin residue in the second heating process can be controlled by the temperature of the heating process (for example, the temperature of the superheated steam) or the period of the heating process or the like. The period of the heating process can be adjusted by, for example, a conveyance speed of the carbon fiber.

Instead of the second heating process, the second dissolving process may be used to remove the resin residue.

The dissolving liquid used in the second dissolving process is not specifically limited as long as it is capable of dissolving the resin in the carbon fiber reinforced plastic, similarly to the first dissolving process. The dissolving liquid includes, for example, the above-described dissolving liquids. The second dissolving process immerses the carbon fiber in the dissolving liquid to dissolve and remove the resin residue while the carbon fiber is wound (that is, while being conveyed).

In the carbon fiber after the second heating process or the second dissolving process, all the residue of the resin is substantially removed, and the bundles of the carbon fibers are undone to be in a form of single fiber. By adding the sizing agent to this carbon fiber, the carbon fiber bundles can be wound up as a bobbin, and the occurrence of fluffing of the carbon fiber and entanglement of the single fibers can be suppressed.

The sizing agent is not specifically limited, and includes, for example, the epoxy resin, urethane resin, vinylester resin, polyamide resin, nylon resin, polyolefin resin (polyethylene or polypropylene), polyester resin, phenol resin, or a mixture of them. Among them, the sizing agent may be epoxy resin, urethane resin, vinylester resin, or polyolefin resin, and the sizing agent is epoxy resin in some embodiments. Use of the epoxy resin as the sizing agent can improve the adhesiveness of the carbon fiber and the epoxy resin. For the sizing agent, one kind may be used alone, or two or more kinds may be used in combination.

The sizing agent is added to the carbon fiber by bringing the sizing agent into contact with the carbon fiber. The method of adding the sizing agent is not specifically limited, and includes, for example, a dipping method, a die coating method, a bar coating method, a roll coating method, and a gravure coating method. Among them, the method employs the dipping method in some embodiments. Specifically, the sizing agent can be added to the carbon fiber by conveying the carbon fiber with a rotor such that the carbon fiber is immersed in the sizing agent arranged in a sizing bath. In some embodiments, the sizing agent is dispersed or dissolved in water or an organic solvent, such as acetone, and used as a dispersion liquid or solution. From the viewpoint of enhancing the dispersibility of the sizing agent and improving liquid stability, a surface-active agent may be appropriately added to the dispersion liquid or solution.

The attached amount of the sizing agent to the carbon fiber is, for example, 0.1 to 10 parts by mass when the total amount of the carbon fiber and the sizing agent is 100 parts by mass. When the attached amount is within this range, appropriate convergence of the carbon fiber can be obtained, sufficient rubfastness of the carbon fiber can be obtained, and generation of fluff due to mechanical friction and the like can be suppressed.

Figure 3:
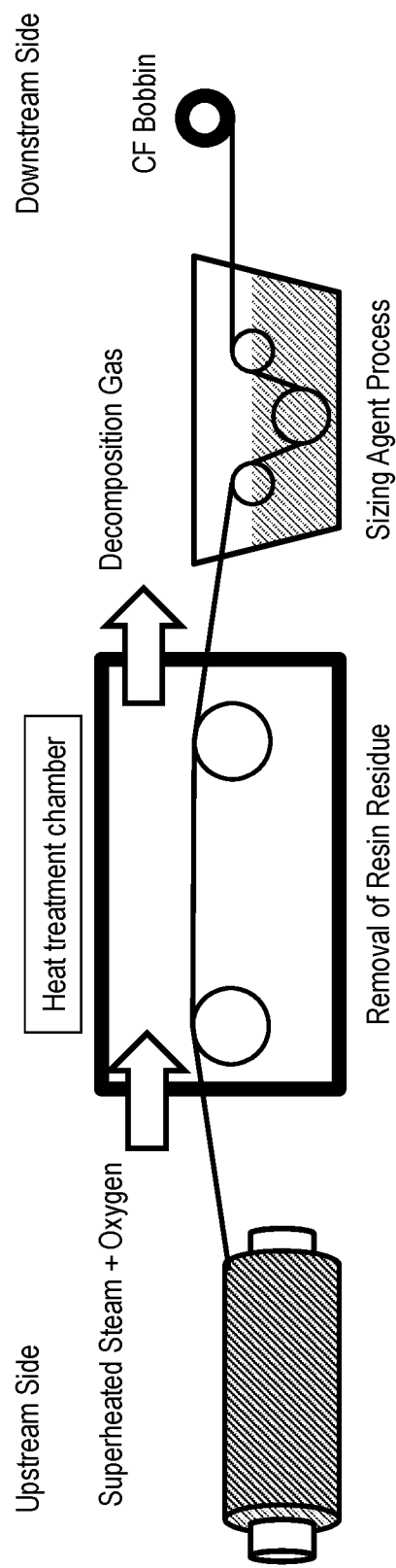
FIG. 3 is a schematic diagram for describing one aspect of a winding step in the embodiment.

FIG. 3 is a schematic diagram for describing one embodiment of the winding step. In FIG. 3, the carbon fiber is drawn out from the tank on the upstream side and is wound up as a bobbin on the downstream side by a winding roller. On the upstream side, the tank after the thermal decomposing/dissolving step is installed on a bearing that can be rotatably driven, and the carbon fiber is drawn out from the tank. A heat treatment chamber for performing the second heating process and a sizing agent bath for performing a sizing agent process are arranged between the tank on the upstream side and the winding roller on the downstream side. The heat treatment chamber is positioned on the upstream side of the sizing agent process. The conveying direction of the carbon fiber is controlled by a plurality of guide rollers such that the carbon fiber is conveyed to the heat treatment chamber and the sizing agent bath. The carbon fiber drawn out from the tank is subjected to heat treatment in the heat treatment chamber to remove the resin residue. Next, the carbon fiber from which the resin residue is removed is guided to the sizing agent bath and immersed. The carbon fiber immersed in the sizing agent bath are pulled up from the sizing agent bath in the direction in which the guide rollers are arranged and is finally wound up as the bobbin by the winding roller. The attached amount (impregnation amount) of the sizing agent can be adjusted to be a desired range by, for example, a nip roller (not illustrated). Further, a drying unit for drying the sizing agent may be arranged.

The winding roller is equipped with a drive device (not illustrated) that provides a driving force for winding the carbon fiber. Further, some guide rollers may also be equipped with a drive device for rotating the guide rollers. In some embodiments, a winding tensile force, that is, a tensile force that is applied to the carbon fiber, is 4 to 5 MPa. By setting the winding tensile force in this range, thread breakage and winding deviation of the carbon fiber can be suppressed, and as a result, a longer continuous fiber can be obtained.

With the embodiment described above, the recycled carbon fiber bobbin of the continuous fiber suitable for reuse, which has not been obtained up to the present, can be obtained. Accordingly, the carbon obtained by the method according to the embodiment can be used for the same usage as a new carbon fiber and is applicable to a wide range of usages.

EXAMPLE

While the following describes the embodiment using examples, the embodiment is not limited to the following examples.

Example 1

Formed Product Preparing Step

As a carbon fiber reinforced plastic formed product, a hydrogen tank was prepared. The hydrogen tank had a carbon fiber reinforced plastic, and the resin was an epoxy resin.

Thermal Decomposing Step

As the thermal decomposing step, the above-described hydrogen tank was arranged in a first heat treatment chamber, the superheated steam was blown in from an introduction port, the carbon fiber reinforced plastic formed product was heated, and the resin was thermally decomposed. The decomposed resin was discharged to the outside from a discharge port as a gas component. The temperature of the heating process was 500° C., and the heating period was 5 hours. This obtained the carbon fiber and the carbide (resin residue) that remained without being decomposed.

Winding Step

By the process as illustrated in FIG. 3 as the winding step, the carbon fiber was wound on a bobbin. The tank after the thermal decomposing step (first heating process) was a laminated body of hard ribbon-shaped tape composed of the carbon fiber and the residue material. First, a paper tube was inserted in the center of the tank to suppress its shape distortion. Next, the end portion of the carbon fiber was located, stripped off with a tool, and gripped with a clip. Next, the carbon fiber for guiding connected to the bobbin, which was installed on the winding roller, was drawn out to an entrance of a second heat treatment chamber and tied with the end portion of the carbon fiber drawn out from the tank in a tight knot.

The second heat treatment chamber has a configuration in which the carbon fiber is continuously heat-treated while the drawn carbon fiber is conveyed by the roller. As the second heating process, the superheated steam and the oxygen were blown in from an introduction port of the second heat treatment chamber to heat the carbon fiber, and while the carbon fiber was conveyed, the resin residue was removed by the thermal decomposition. By this second heating process, the resin residue was almost completely removed. Since binding between the carbon fibers is also undone by the removal of the resin residue, the carbon fiber becomes in a state of the single fiber instead of the fiber bundle. However, in this process, the carbon fiber was wound out in a tied state, and therefore, the carbon fiber was not undone on appearance. The degree of the decomposition of the resin can be controlled by the temperature of the superheated steam and the processing time (feed speed). The feed speed can be controlled by winding speed of the bobbin, and the tensile force can be controlled by a guide roll.

Next, the carbon fiber after the second heating process was fed to the sizing agent bath and provided with the sizing agent process by a soaking method. By this sizing agent process, the single fibers were bound to form a fiber bundle, and smoothness of the surface was also added. As the sizing agent, the epoxy resin (trade name: DENATITE, manufactured by Nagase ChemteX Corporation) was used.

Next, the carbon fiber was wound up with the bobbin to obtain the recycled carbon fiber.

Examples 2 to 5, Comparative Example 1

By setting in the same way as Example 1 except that the temperatures and periods of the first heating process, the temperatures and periods of the second heating process, the tensile forces and speeds of the winding, and the presence or absence of adding the sizing agent were set as indicated in Table 1, the recycled carbon fibers were obtained.

The lengths of the obtained recycled carbon fibers are shown in Table 1.

TABLE 1

| | Thermal decomposing step | | Winding step | | | | | |
|---|---|---|---|---|---|---|---|---|
| | First heating process | | Second heating process | | Winding | | Addition | Fiber |
| | Temperature (° C.) | Period (hr) | Temperature (° C.) | Period (min) | Tensile force (MPa) | Speed (m/min) | of sizing agent | length (m) |
| Example 1 | 500 | 5 | 500 | 10 | 4 | 3 | Presence | 3000 |
| Example 2 | 400 | 6 | 600 | 5 | 5 | 6 | Presence | 2500 |
| Example 3 | 700 | 4 | 500 | 10 | 4 | 3 | Presence | 10 |
| Example 4 | 500 | 5 | 700 | 5 | 4 | 6 | Presence | 20 |
| Example 5 | 500 | 5 | 500 | 10 | 10 | 3 | Presence | 50 |
| Comparative Example 1 | 400 | 6 | 600 | 5 | 5 | 6 | Absence | — |

As shown in Table 1, in Examples 1 to 5, the continuous fibers on the order of meters were able to be obtained. In particular, under the conditions of Examples 1 and 2, the continuous fibers on the order of kilometers were able to be obtained without causing thread breakage. On the other hand, in Comparative Example 1, the continuous fiber in a reusable state were not able to be obtained due to poor winding. Accordingly, it was confirmed that the continuous carbon fibers suitable for reuse can be obtained with this embodiment.

Upper limit values and/or lower limit values of respective numerical ranges described in this description can be appropriately combined to specify an intended range. For example, upper limit values and lower limit values of the numerical ranges can be appropriately combined to specify an intended range, upper limit values of the numerical ranges can be appropriately combined to specify an intended range, and lower limit values of the numerical ranges can be appropriately combined to specify an intended range.

While the embodiment has been described in detail, the specific configuration is not limited thereto. Design changes within a scope not departing from the gist of the disclosure are included in the disclosure.

What is claimed is:

1. A method of recycling carbon fibers, the method comprising:
   preparing a carbon fiber reinforced plastic formed product that includes a carbon fiber reinforced plastic containing a carbon fiber and a resin;
   thermally decomposing or dissolving the resin in the carbon fiber reinforced plastic formed product by a first heating process or a first dissolving process; and
   winding while drawing the carbon fiber from the carbon fiber reinforced plastic formed product after the first heating process or the first dissolving process,
   wherein the winding further includes thermally decomposing or dissolving a residue of the resin attached to the carbon fiber by a second heating process or a second dissolving process and adding a sizing agent to the carbon fiber after the second heating process or the second dissolving process.

2. The method according to claim 1,
   wherein the carbon fiber is stripped upstream while the carbon fiber is wound downstream, and the residue of the resin is removed by the second heating process or the second dissolving process and subsequently the sizing agent is added after the carbon fiber is stripped and before the carbon fiber is wound.

3. The method according to claim 1,
   wherein the resin in the carbon fiber reinforced plastic formed product is thermally decomposed by the first heating process.

4. The method according to claim 3,
   wherein the first heating process is performed using superheated steam.

5. The method according to claim 3,
   wherein the first heating process has a temperature of 400° C. to 500° C.

6. The method according to claim 1,
   wherein the residue of the resin attached to the carbon fiber is thermally decomposed by the second heating process.

7. The method according to claim 6,
   wherein the second heating process is performed using superheated steam.

8. The method according to claim 6,
   wherein the second heating process has a temperature of 500° C. to 600° C.

9. The method according to claim 1,
   wherein the carbon fiber is drawn to apply a tensile force of 4 to 5 MPa to the carbon fiber.

10. The method according to claim 1,
    wherein the carbon fiber reinforced plastic formed product is a tank.

* * * * *